(12) United States Patent
Balmakhtar et al.

(10) Patent No.: US 12,348,314 B2
(45) Date of Patent: Jul. 1, 2025

(54) DUPLICATE MESSAGE REMOVAL TECHNIQUE FOR IMPROVING RETRANSMISSION SUCCESS RATE

(71) Applicant: T-Mobile Innovations LLC, Overland Park, KS (US)

(72) Inventors: Marouane Balmakhtar, Fairfax, VA (US); Brian Waters, Angel Fire, NM (US)

(73) Assignee: T-Mobile Innovations LLC, Overland Park, KS (US)

( * ) Notice: Subject to any disclaimer, the term of this patent is extended or adjusted under 35 U.S.C. 154(b) by 330 days.

(21) Appl. No.: 17/579,744

(22) Filed: Jan. 20, 2022

(65) Prior Publication Data
US 2023/0231657 A1    Jul. 20, 2023

(51) Int. Cl.
| | |
|---|---|
| H04W 28/06 | (2009.01) |
| H04L 1/08 | (2006.01) |
| H04L 1/1607 | (2023.01) |
| H04L 5/00 | (2006.01) |
| H04L 47/22 | (2022.01) |
| H04W 24/10 | (2009.01) |
| H04W 72/0446 | (2023.01) |
| H04W 72/1268 | (2023.01) |
| H04W 76/38 | (2018.01) |

(52) U.S. Cl.
CPC .............. H04L 1/1642 (2013.01); H04L 1/08 (2013.01); H04L 5/0078 (2013.01); H04W 28/06 (2013.01)

(58) Field of Classification Search
CPC ....... H04L 12/2863; H04L 47/34; H04L 1/08; H04L 1/1642; H04L 5/0078; H04L 67/14; H04M 15/66; H04M 15/8221; H04M 15/8228; H04M 15/84; H04M 15/83; H04W 12/037
USPC ......................................... 370/315, 329, 312
See application file for complete search history.

(56) References Cited

U.S. PATENT DOCUMENTS

| | | | |
|---|---|---|---|
| 10,887,944 B2* | 1/2021 | Skog | H04W 4/24 |
| 2012/0300648 A1* | 11/2012 | Yang | H04L 1/20 370/252 |
| 2015/0295635 A1* | 10/2015 | Koskiahde | H04L 12/2863 370/315 |
| 2019/0223152 A1* | 7/2019 | Ke | H04W 76/27 |
| 2020/0084663 A1* | 3/2020 | Park | H04W 8/08 |
| 2020/0100324 A1* | 3/2020 | Wittberg | H04W 24/02 |
| 2020/0107213 A1* | 4/2020 | Park | H04W 76/27 |
| 2021/0051736 A1* | 2/2021 | Jeon | H04W 76/11 |
| 2021/0289566 A1* | 9/2021 | Jimenez Cordon | H04L 63/1458 |
| 2022/0006735 A1* | 1/2022 | Lee | H04L 67/14 |

(Continued)

Primary Examiner — Marcus Smith
Assistant Examiner — Jason A Harley
(74) Attorney, Agent, or Firm — Jones Robb, PLLC

(57) ABSTRACT

Systems and methods are provided for duplicate message detection and removal. A method includes receiving a message tagged with a sequence number during one of a first timing window and a second timing window, wherein the first and second timing windows are consecutive recurring timing windows in a network. The method additionally includes sending a response to the message during one of the timing windows and marking the sequence number with the timing window of the response. The method further includes adding the marked sequence number to an exclusion list and after a next timing window expires, deleting the sequence number from the exclusion list.

20 Claims, 9 Drawing Sheets

(56) References Cited

U.S. PATENT DOCUMENTS

| | | | |
|---|---|---|---|
| 2022/0201564 A1* | 6/2022 | Zhang | H04W 36/0069 |
| 2023/0223965 A1* | 7/2023 | Poulin | H04B 1/006 |
| | | | 455/269 |
| 2023/0223985 A1* | 7/2023 | Rastegardoost | H04W 72/23 |
| | | | 375/132 |
| 2023/0337228 A1* | 10/2023 | Fu | H04W 72/23 |
| 2023/0353685 A1* | 11/2023 | Lee | H04M 15/74 |

\* cited by examiner

DUPLICATE MESSAGE REMOVAL TECHNIQUE FOR IMPROVING RETRANSMISSION SUCCESS RATE

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)).

As access nodes have evolved, networks may include a combination of multiple access node such as 4G LTE evolved NodeBs (eNodeBs) and 5G NR next generation NodeBs (gNodeBs) or alternatively may be exclusively 4G or 5G cellular systems. 5G networks aim to offer new technical solutions allowing for a greater throughput, lower latency, higher reliability, higher connectivity, and higher mobility range than previous technologies. 5G networks are also expected to extend the flexibility in the network usage and to enable users with a wider range of use cases and business models.

In 5G networks, Packet Forwarding Control Protocol (PFCP) is used on the N4/Sx interface between the control plane and the user plane function. PFCP may be utilized both in 5G NR and also in in the 4G/LTE EPC to implement the Control and User Plane Separation (CUPS). PFCP and the associated interfaces seek to formalize the interactions between different types of functional elements used in core networks as deployed by 4G and 5G operators.

Two different types of functional elements are the control plane (CP) functional elements and the user-data plane (UP) functional elements. The CP functional elements handle mostly signaling procedures (e.g. network attachment procedures and management of user-data plane paths). The UP functional elements handle mostly packet forwarding, based on rules set by the CP elements. For example, in the 5G service based architecture (SBA), a session management function (SMF) is responsible for interacting with the data plane and managing session context with the user plane function (UPF). Thus, the SMF deals with session management aspects by creating, updating, and removing PDU sessions and handles session context with the UPF. The SMF sends messages to the UPF over the N4 reference interface using PFCP. The UPF performs packet processing and connects wireless devices via the access network. Specifically, the UPF is responsible for packet routing and forwarding, packet inspection, quality of service (QoS) handling, and external packet data unit (PDU) session for an interconnecting data network (DN), in the 5G architecture.

The Third Generation Partnership Project (3GPP) Technical Specification TS 29.244 "Interface between the Control Plane and the User Plane of EPC Nodes" defines the PFCP used on an interface between a CP function and a UP function in a cellular communications network. Although PFCP supports reliable delivery of messages, the failure to check for duplicate messages at the receiving end may lead to difficulties such as higher load issues and increased computational complexity.

PFCP necessitates retransmitted messages to have the same contents as the original message. Each PFCP message bundled in a single User Datagram Internet Protocol (UDP/IP) packet has its own sequence number. In other words, a message sequence number uniquely identifies a PFCP message. In the case in which a UDP/IP packet carrying PFCP messages is lost, retransmitted PFCP messages are not necessarily re-sent in the same original order making difficult to detect if there is a valid retransmission. A receiver may, in some cases respond to a request and the response is not received in a timely manner by the sender. Therefore the sender, based on its timer, sends a retransmission, which is a duplicate message for which a response has already been sent.

Accordingly, a solution is needed that supports the detection of valid PCFP message retransmissions by also checking for message duplicates (messages that have been received and responded to by the receiver). Accordingly, the proposed approach for detecting message duplicates results in a reduction in computational complexity and bandwidth requirements and an improved retransmission rate.

OVERVIEW

Exemplary embodiments described herein include systems, methods, and non-transitory computer readable mediums for duplicate message detection. An exemplary method includes receiving a message tagged with a sequence number during one of a first timing window and a second timing window, wherein the first and second timing windows are consecutive recurring timing windows in a network. The method further includes sending a response to the message during one of the timing windows and marking the sequence number with the timing window of the response. The method additionally includes maintaining a record of the marked sequence number and after a next timing window expires, deleting the record of the marked sequence number.

An additional exemplary embodiment includes a system for duplicate message detection. The system includes at least one processor programmed to perform multiple operations. The operations include receiving a message tagged with a sequence number during one of a first timing window and a second timing window, wherein the first and second timing windows are consecutive recurring timing windows in a network. The operations additionally include sending a response to the message during one of the timing windows, marking the sequence number with the timing window of the response, and adding the marked sequence number to an exclusion list. After a next timing window expires, the operations include deleting the sequence number from the exclusion list.

In yet a further exemplary embodiment, a non-transitory computer readable medium storing instructions for execution by a processor is provided. When executed by a processor, the instructions cause multiple operations to be performed. The operations include receiving a message tagged with a sequence number during one of a first timing window and a second timing window, wherein the first and second timing windows are consecutive recurring timing windows in a network. The operations additionally include sending a response to the message during one of the timing windows, marking the sequence number with the timing window of the response, and adding the marked sequence number to an exclusion list. After a next timing window expires, the operations include deleting the sequence number from the exclusion list.

DETAILED DESCRIPTION

Figure 1:
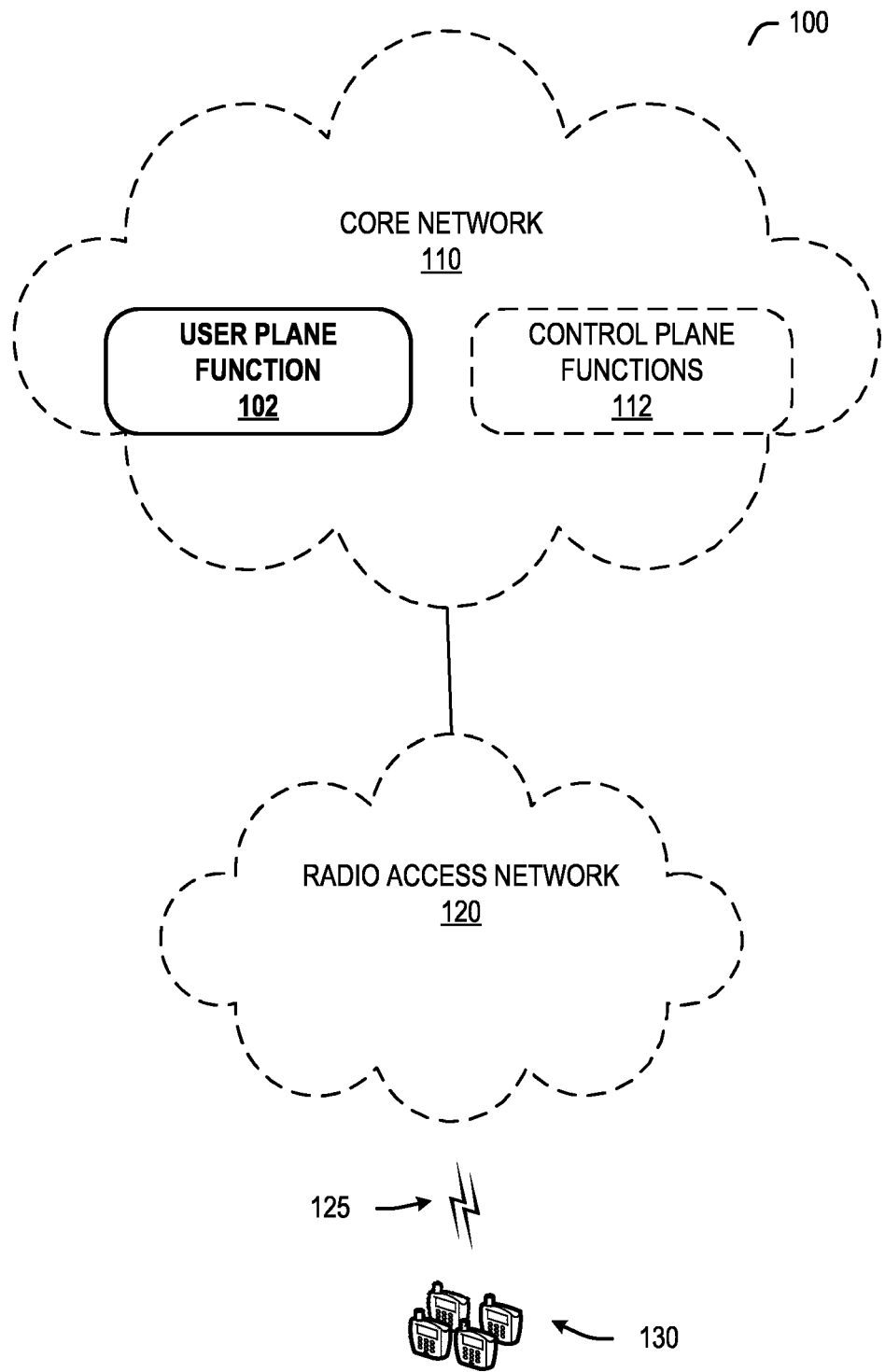
FIG. 1 depicts an exemplary system for wireless communication, in accordance with the disclosed embodiments.

Exemplary embodiments described herein include systems, methods, and computer readable mediums for duplicate message detection and removal in order to improve retransmission success rates in cellular networks.

More specifically, embodiments set forth herein include enhanced logic for targeting a PFCP enhancement to improve cellular networks, and in particular 5G networks. When utilizing PFCP and other similar protocols, a session management function (SMF) component or other similar component may send a message to the UPF. If the SMF does not receive a response from the UPF in a predetermined time period, it may re-transmit the message. PFCP necessitates that retransmitted messages have the same contents as the original message. Each PFCP message bundled in a single UDP/IP packet has its own sequence number. Thus, a message sequence number uniquely identifies a PFCP message. Because there are a limited number of message sequence numbers, the message sequence numbers are reused over time, thereby in some instances, making it difficult to distinguish a new message from a retransmitted message.

Embodiments set forth herein propose a mechanism to support the detection of valid PCFP message retransmissions by also periodically checking for message duplicates. This approach can lead to a reduction in computational complexity and bandwidth requirements, as the current approach of not detecting message duplicates creates higher load issues and added computational complexity.

In embodiments set forth herein, a sender, such as an SMF component, sends a PFCP Session Establishment Request message (message or request) to a UPF component, the message becomes a local pending transaction at the UPF component. The sender or SMF component starts a timer when it sends the message. If the SMF sender does not have a response within a predetermined time period, (e.g., 5 seconds), it will send that message again. The sender will retransmit the message up to a predetermined number of attempts (e.g., 3 re-transmission requests) as long as it does not receive a response. After the predetermined number of attempts, the sender (SMF) indicates that the recipient (UPF) is not responsive. For example, the sender (SMF) determines that the targeted UPF component is unreachable and either selects an alternate UPF component as a destination or abandons the session and optionally sends a failure notification to the access and mobility management function (AMF).

On the receiving side, at the UPF component, multiple copies of the same message could be received when the sender retransmits the message. If the message can't be processed within the predetermined time period (i.e., 5 second window of the sender), another copy of the message or duplicate message may be received despite the fact that that the receiver transmitted a response. In embodiments set forth herein, the recipient determines that this duplicate message should be discarded.

Thus, in embodiments set forth herein, a method creates two windows. At any given time, a first or current window has a time span equal to the retransmission period. A second time window sequentially follows the first time window and also has a time span equal to the retransmission period. Embodiments set forth herein toggle between the two windows to detect duplicate messages.

The method may set a timer to delineate separation between windows. For example, the first window, may spans from zero to five seconds. When the timer expires, the second window is activated. Accordingly, a UPF component may receive a message in the first window. When the UPF component sends a response, the duplicate message analysis processor may tag the sequence number of the message with the window in which the response is sent. Thus, if the response is sent during the first time window, the duplicate message processor tags the sequence number of the message with the first window.

In addition to tagging the sequence number of the response with the window in which it was sent, the method may add the tagged sequence number to an exclusion list. When the timer expires, the second window is active, for example from 5 seconds to 10 seconds. After the expiration of the second window, the first window again becomes active. When the first window again becomes active, the method checks the exclusion list and clears sequence numbers tagged with the first window. Thus, if a response was sent during the first window, the sequence number can be removed from the exclusion list and can be utilized again by the sender.

Further, in embodiments set forth herein, incoming messages are inspected by looking up the sequence number of the message on the exclusion list. If the sequence number exists on the exclusion list, then the method discards the message as a duplicate. If the sequence number is not on the exclusion list, the method considers the new message to be unique.

In embodiments set forth herein, the network may be a 5G NR network or a combined 4G/5G network. It is assumed that the retransmission periods and thus, the windows are consistent throughout the network. Thus, in described embodiments, control signaling received at a UPF component comes from a single core network. Accordingly, a common configuration exists across PFCP elements within that core network such that they have the same number of retries and same length of windows.

An exemplary system described herein includes at least an access node (or base station), such as an eNodeB, or gNodeB, and a plurality of end-user wireless devices. The disclosed technology may be applied to communication between an end-user wireless device and an access node (e.g., base station) and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations of duplicate message detection and removal may be implemented as computer-readable instructions or methods and processing nodes on the network for executing the instructions or methods. The processing node may include a processor included in the UPF component or access node or a processor included in any controller node in the wireless network that is coupled to the access node.

FIG. 1 depicts an exemplary communication network 100. A core network 110 includes a user plane function 102 and control plane functions 112. The core network 110 is illustrated as being coupled to a radio access network (RAN) 120 that serves wireless devices 130 over communication links 125. For example, the wireless devices 130 can be end-user wireless devices (e.g., UEs), communication links 125 use 5G NR, 4G LTE, or any other suitable type of radio access technology (RAT), and core network 110 can be structured using a service-based architecture (SBA) utilizing core network functions and elements, including the user plane functions 102 and the control plane functions 112.

The RAN 120 can include various access network functions and devices disposed between the core network 110 and the end-user wireless devices 130. For example, the RAN 120 includes at least an access node (or base station), such as an eNodeB and/or gNodeB communicating with a plurality of end-user wireless devices 130. It is understood that the disclosed technology may also be applied to communication between an end-user wireless device and other network resources, depending on the RAT and network technology being implemented. Further, either of core network 110 and radio access network 120 can include one or more of a local area network, a wide area network, and an internetwork (including the Internet) and capable of communicating signals and carrying data, for example, to support voice, push-to-talk, broadcast video, and data communications by end-user wireless devices 130.

UPF 102 and other positions within the illustrated network topology can include programmable network devices (and integrated circuits provided thereon) that enhance or replace the myriad existing packet gateways, such as a CUPS based user plane S-GW, P-GW, or SAE-GW in 4G networks, and user plane functions (UPF) in 5G networks. This eliminates having to transport the data packets to central sites or networks, while providing robust and secure filtration of network edges. Further, incorporating packet processing and data session management functions into these programmable networking devices also minimizes the need for extra control plane elements and communication therebetween. Since it is beneficial to have the user plane co-located (or as close as network architecture allows) to the access node, and then directly egress from that user plane to the destination network, this configuration reduces or eliminates extraneous transport of data through the core network.

In one example, UPF 102 can include one or more programmable network devices with a plurality of network functions embedded thereon, such as a duplicate message detection and removal. One such example of a programmable networking device includes one or more field programmable gate arrays (FPGAs) configured with a host server (or simply "host") enabling communication with other network devices on different interfaces including control and user interfaces. Such programmable networking devices can perform various functions including data session management, security/firewall, data processing, pre-processing, post-processing, pipeline processing, and data transport and switching functions. Other functions performed by an exemplary UPF 102 include communicating with other network components, such as a controller node, managing health of different network nodes such as eNodeBs, gNodeBs, other components of a UPF, or any network node along the data path, as well as tunnel identification management, session identifier management, receiving control-plane instructions from a session management function (SMF) in the case of 5G, and the SGW-C and PGW-C in the case of 4G, etc. Based on the instructions from the controller node, a host module of the programmable networking device can determine how to process the data sessions associated with the data packets it receives. The host module interacts with an embedded circuit such as an FPGA that is programmed to transmit and receive session data, routing tables, and pipeline processing including updating packet headers, applying quality of service (QoS) policies, and forwarding/transporting the data packets associated with the data sessions, based on the information received from the host module.

The core network 110 may incorporate many functions not shown in FIG. 1. For example, the control plane functions 112 may include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane functions 102 may also include, for example, a Unified Data Repository (UDR). Control plane functions 112 can provide one or more network functions based on a request-response or subscribe-notify model. The network functions may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 110. To use other network functions, registered functions can send service requests to the NRF.

The UDM interfaces with network functions such as AMF and SMF so that relevant data becomes available to AMF and SMF. The UDM generates authentication vectors when requested by the AUSF, which acts as an authentication server. The AMF performs the role of access point to the 5G core, thereby terminating RAN control plane and UE traffic originating on either the N1 or N2 reference interface. In the 5G core, the functionality of the 4G Mobility Management Entity (MME) is decomposed into the AMF and the SMF. The AMF receives all connection and session related information from the UE using N1 and N2 interfaces, and is responsible for handling connection and mobility management tasks.

The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

Wireless devices 130 may be any device, system, combination of devices, or other such communication platform capable of communicating wirelessly with RAN 120 using one or more frequency bands deployed therefrom. Each of wireless devices 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via RAN 120. Other types of communication platforms are possible.

Other network elements may be present to facilitate communication but are omitted for clarity, such as base stations, base station controllers, mobile switching centers, dispatch application processors, and location registers such as a home location register or visitor location register. Components not specifically shown in FIG. 1 can further include processing nodes, controller nodes, routers, gateways, and physical and/or wireless data links for communicating signals among various network elements, additional base stations, controller nodes, telephony switches, internet routers, network gateways, computer systems, communication links, or other type of communication equipment, and combinations thereof.

Figure 2:
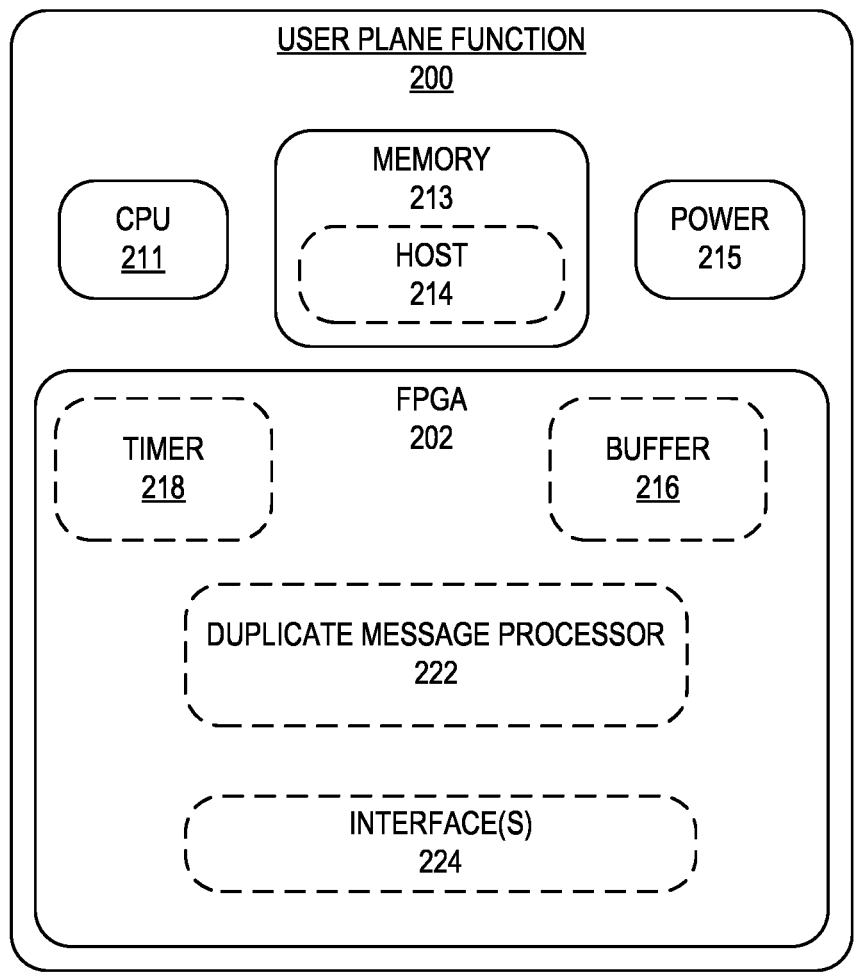
FIG. 2 depicts an UPF device in accordance with the disclosed embodiments.

FIG. 2 illustrates an exemplary UPF 200. In embodiments disclosed herein, the UPF includes a programmable network device configured to perform user plane functions on data streams within a compact and modular hardware unit to minimize excessive communication while maintaining control and user plane separation (CUPS). The programmable network device can include one or more processors, memories, and one or more embedded hardware chips, such as a field programmable gate array (FPGA), an application-specific integrated circuit (ASIC), or similar. In exemplary embodiments described herein, a host module on a memory coupled to a processor can interface between an FPGA programmed with UPF functionality and a control plane network node or gateway. The user plane functions performed by such a device can include applying quality of service (QoS) policies to data packets traversing the user plane, managing data sessions associated with different rules such as guaranteed bit rate (GBR) and maximum bit rate (MBR) and token buckets associated therewith, pipeline processing, synchronizing transmission of data packets and control signals with timers at various operational levels, and so on.

Such programmable network devices can enhance or replace the myriad existing packet gateways, such as a CUPS based user plane S-GW, P-GW, or SAE-GW in 4G networks, and user plane functions (UPF) in 5G networks. This eliminates the need for an external host server, as well minimizing excessive communication and signaling that is required to communicate between the separate prior-art switches and external host servers. Incorporating data management functions into these programmable network devices also minimizes the need for extra control plane elements and communication therebetween.

The UPF 200 depicted in FIG. 2 includes at least a processor 211, a memory 213, a power supply 215, and an FPGA 202. Host server (or "host") 214 is configured to manage data sessions and life cycles associated with data packets that are processed by FPGA 202, and to interface with a control plane network node or gateway. For example, host 214 can receive control-plane instructions from a session management function (SMF), a gateway control plane (SGW-C, PGW-C, or SAEGW-C), or a controller node. Further, host 214 can initiate processes or kernels on configurable logic blocks (CLBs) or modules of the FPGA 202, including interfacing with persistent kernels and communicating information about data packets and sessions between the kernels and other network elements. Each kernel or module can communicate with other kernels, and transfer information to and from other kernels. For example, a duplicate message processor kernel 222 is configured to receive messages, such as, for example, a PFCP Session Establishment Request message over an N4 interface from the SMF and determine whether the messages are duplicate messages. The duplicate message processing kernel 222 may interact with a timer kernel 218, buffer kernel 216, and interface 224.

Interface(s) 224 can include one or more ports associated with different reference points, or configured to communicate with different network nodes or devices, e.g., one or more gateways or functions on the core network, or any other network node on the DN, including but not limited to application servers, session management, proxy, web server, media server, or end-user wireless devices coupled to another wireless network or RAN. For example, interface 224 can include a first set of ports associated with reference points for data transmission between different network nodes, and a second set of ports associated with reference points for control signal transmission between different network nodes.

Further, the duplicate message processor 222 can operate on control data packets originating from a source node and destined to a destination node. For example, the control data packets can be received from any type of network node, including an access node, controller node, gateway, external network node, virtual private network (VPN) node, and so on. As described herein, the control data packet can be received via one or more different ports, interfaces, or reference points configured on the programmable networking device.

The interface 224 may include multiple ports associated with multiple reference points. For example, the interface 224 may include a port associated with the N3 reference point, which is used as a data input or output between the programmable networking device and a radio access network or access node within the radio access network or the N6 reference point, which is used as a data input or output between the programmable networking device and a data network (DN). Further, the interface 224 may include a port associated with the N9 reference point (not shown), which is used as a data input or output between the programmable networking device and another programmable networking device.

In exemplary embodiments, the interface 224 includes at least a port associated with a control signal reference point, such as the N4 reference point, which is used as an input for control signals. For example, as described herein, a management module in a programmable networking device is configured to receive session information from a control gateway or SMF, via the port associated with the N4 reference point. The control information received via the N4 reference point includes information related to provisioning a new session, e.g., using PFCP, quality of service information, billing information, unique identifiers for a session, and so on. In an embodiment, information received via the N4 reference point enables the programmable networking device to perform session life cycle management.

Figure 3:
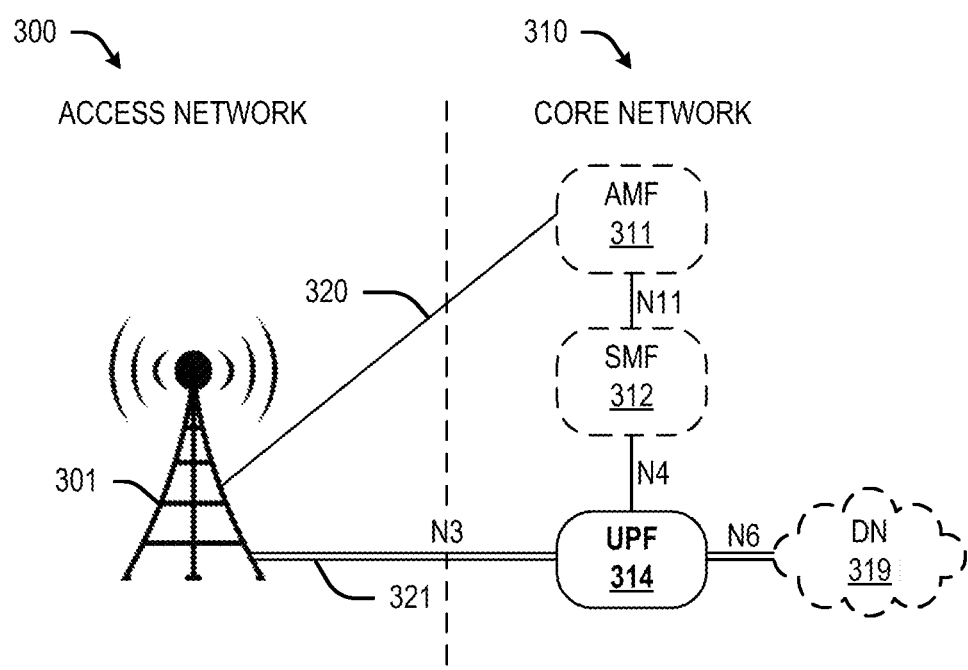
FIG. 3 illustrates an exemplary configuration showing control and user plane separation within a 5G system in accordance with disclosed embodiments.

FIG. 3 depicts incorporation of embodiments described in a 5G system. The components of the exemplary 5G system include an access network 300 including at least an access node 301, which can include a gNodeB. Data packets traverse access network 300 and a core network 310 via the user plane 321, while control signals are transmitted across access network 300 and core network 310 via the control plane 320. In an exemplary embodiment, access and mobility function (AMF) 311 and session management function (SMF) 312 function similarly to mobility management entities in 4G systems. For example, the AMF 311 can receive connection requests from one or more wireless devices via access node 301, and manages anything to do with connection or mobility management, while forwarding session management requirements over an N11 interface to the SMF 312. Meanwhile, the SMF 312 is primarily responsible for interacting with the decoupled data plane 321, creating updating and removing Protocol Data Unit (PDU) sessions and managing session context with a UPF 314. Generally, the UPF 314 represents the data plane evolution of a 4G CUPS system, which decouples PGW control and user plane functions, enabling data forwarding to be decentralized. This allows packet processing and traffic aggregation to be performed closer to the network edge, increasing bandwidth efficiencies while reducing network. The UPF 314 functions similarly, by providing an interconnect point between the mobile infrastructure and the DN 319, encapsulation and decapsulation of GPRS Tunnelling Protocol for the user plane (GTP-U), acting as a PDU session anchor point for providing mobility within and between Radio Access Technologies (RATs), including sending one or more end marker packets to the gNodeB 301, and packet routing and forwarding functions.

Meanwhile, as described herein, the UPF 314 may be or a include a traditional UPF including a plurality of different servers and switches or alternatively a programmable network device, such as that shown in FIG. 2 above. Thus, the UPF 314 may be configured to perform various data session management functions including the duplicate detection and removal process described herein.

Further, the UPF component 314, when provided as a programmable network device, can include one or more ports that are associated with different reference points. For example, the UPF component 314 can include a first set of ports associated with reference points for data transmission between different network nodes, and a second set of ports associated with reference points for control signal transmission between different network nodes. This can include at least a port associated with the N3 reference point, which is used as a data input or output between the UPF component 314 and access node 301. Further, the UPF component 314 includes at least a port associated with the N6 reference point, which is used as a data input or output between the programmable network switch and DN 319. Further, the UPF component 314 includes at least a port associated with the N9 reference point (not shown), which is used as a data input or output between other programmable network switches not shown herein. For example, the N9 reference point may be utilized between two UPFs, when one is not available or not responding. Further, the UPF component 314 includes at least a port associated with a control signal reference point, such as the N4 reference point, which is used as an input for control signals via control plane 320. For example, as described herein, a server or host module in the UPF component 314 is configured to receive session information from SMF 312, via the port associated with the N4 reference point. The control information received via the N4 reference point includes information related to provisioning a new session (e.g. using the packet forwarding control protocol (PFCP), quality of service information, billing information, unique identifiers for a session, and so on.

Further, UPF component 314 may include several programmable network devices, arranged such that data packets originating from various RANs can traverse minimal other networks or nodes to reach their destination. Incorporating data management functions into these programmable network devices also minimizes the need for extra control plane elements and communication therebetween. Since it is beneficial to have the user plane co-located (or as close as network architecture allows) to the access node, and then directly egress from that user plane to the destination data network (e.g. DN 319), this configuration reduces or eliminates extraneous transport of data through the core network.

Figure 4:
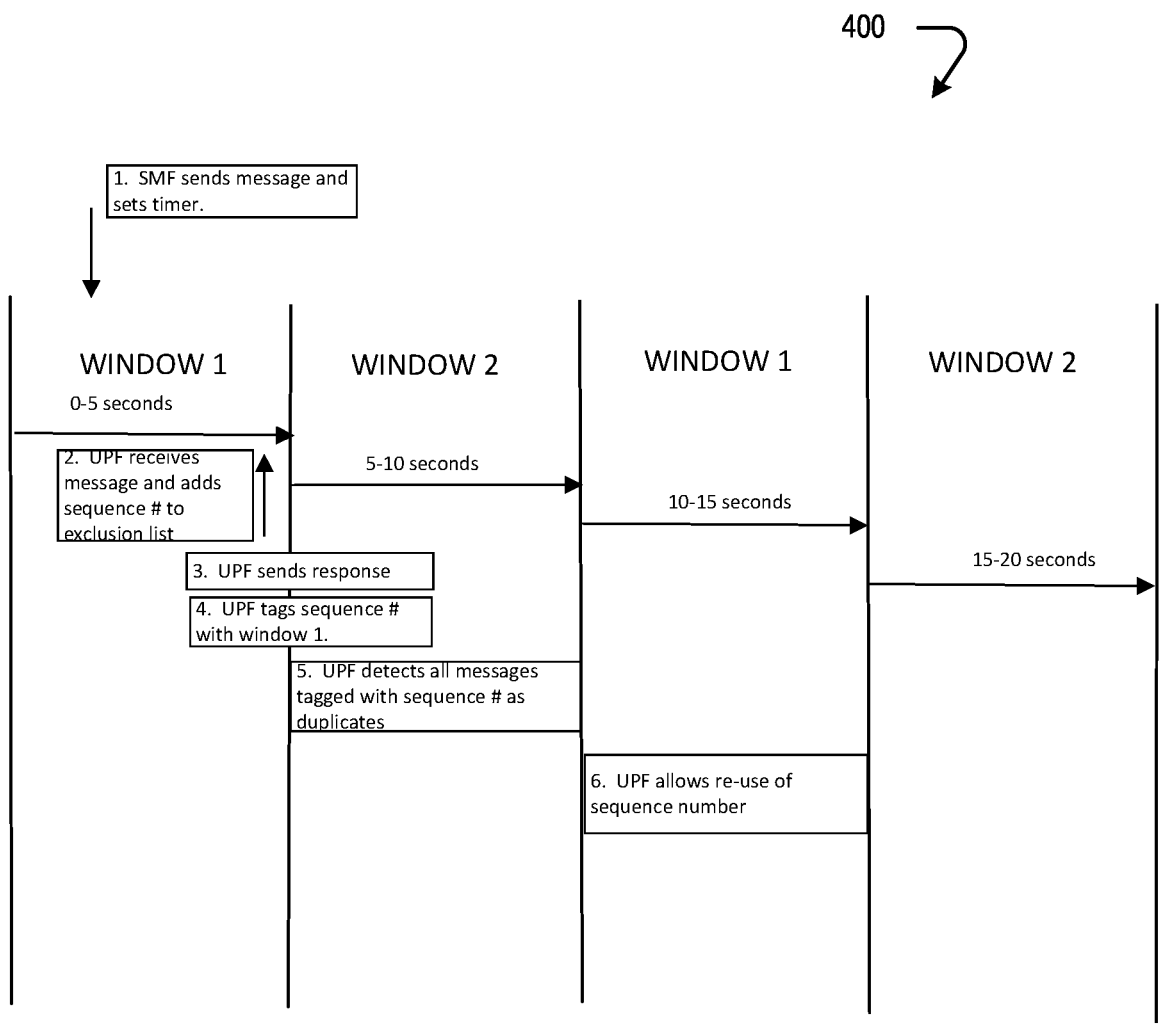
FIG. 4 is a flow diagram depicting an exemplary method for sending and retransmitting messages in accordance with disclosed embodiments.

FIG. 4 is a diagram 400 depicting an example of the use of repeating windows utilized for duplicate detection by a UPF component 200 in PCFP. As illustrated, repeating windows, "WINDOW 1" and "WINDOW 2", of equal duration are configured. The duration of the windows is also equal to retransmission time period set at the SMF. In the illustrated embodiment, each window has a five second duration. However, it is likely that the actual duration, which is network specific, would be shorter than five seconds. While the steps illustrated in FIG. 4 are illustrated as occurring between one SMF and one UPF, it should be understood that multiple SMFs and UPFs may be included in the system.

In step 1, the SMF sends a request or message and sets its retransmission timer. The request may be or include a PFCP session establishment message or request. The request becomes a local pending transaction at the UPF. Each request or message is accompanied by a sequence number. If the message is retransmitted, it is accompanied again by the same sequence number.

Because PFCP is UDP based and therefore connectionless, delivery is not guaranteed and the need for retransmission and hence duplicate detection arises. The purpose of the timer is to determine when a retransmission should be sent by the SMF. That is, if no response has been received at the SMF by the time the timer expires, the SMF will re-transmit the message. Although only one message transmission is illustrated in FIG. 4, it should be understood, that if the SMF does not receive a response when the timer elapses, it will retransmit the message. This process will occur repeatedly until a maximum number of re-transmissions is reached. The maximum number of re-transmissions should be uniformly set in the core network. The request or message can be or include one of multiple types of messages, such as node messages or session messages. Within node messages, which are system level messages, many health checks are required. In Cisco® systems, sequence numbers 1-5 exclusively are used for these messages, so with only five sequence numbers, frequent recycling of sequence numbers is required. Further, although in the illustrated embodiment, the SMF sends a message to the UPF, the opposite process can also occur as some messages originate at control plane and others by the user plane. Thus, requests can originate from the opposite side. In the illustrated embodiment, the sending of the message and the setting of the timer occurs within WINDOW 1.

In step 2, the UPF receives the message and adds the sequence number of the message to an exclusion list. In step 3, the UPF sends a response to the request sent by the SMF. In the illustrated embodiment, the response is sent during WINDOW 1, which lasts from zero to five seconds. However, it should be understood that the response could alternatively be sent during WINDOW 2. In step 4, the UPF tags the sequence number accompanying the request and added to the exclusion list with WINDOW 1. Now the UPF has responded and has tagged the sequence number with WINDOW 1. Because of the retransmission process, the receiving end, in this case the UPF, needs to determine if further requests or messages are duplicates before responding.

Accordingly, during WINDOW 2, in step 5, the UPF detects all messages with the sequence number tagged with WINDOW 1 as duplicates. Accordingly, if the SMF does not receive the UPF response sent in step 3 prior to the expiration of the timer set by the SMF and it sends a retransmission received by the UPF between 5 and 10 seconds, that retransmission will be ignored as a duplicate since the UPF has already responded to the message in step 3. In the illustrated example, WINDOW 2 is active between five and ten seconds. Thus, during this time period, messages with the sequence number tagged with WINDOW 1 will be discarded or ignored as duplicates at the destination UPF.

In step 6, which occurs at the beginning of WINDOW 1 (between 10 and 15 seconds), the UPF will remove the tagging of the sequence number so that the sequence number can be re-used by the sender.

Accordingly, in a situation in which the UPF sends the response in step 3 at 4.9 seconds, the timer may expire at the SMF before the SMF receives the response. Therefore, the SMF may retransmit the message during WINDOW 2. By the process described herein, the UPF will recognize the retransmitted message during WINDOW 2 as a duplicate.

Thus, the two windows can be facilitated by one timer in the core network that expires at regular intervals, thereby defining two recurring windows. By tagging of the recorded sequence numbers with the window when the response was sent, duplicates can be recognized. By removing the sequence numbers after expiration of the next window, the method is able to determine that a message using the sequence number is no longer a duplicate, as illustrated in step 6.

Although the example illustrated in FIG. 4, includes only one SMF and one UPF, networks may typically include multiple SMFs communicating with a UPF, each having their own sequence numbers. In this instance, a list of sequence numbers may be created for each SMF.

Embodiments disclosed herein function within an integrated system having a single core network with a common configuration across all PFCP elements within that core network. Thus, all of the elements or components have the same number of retries and the same window durations. Thus, to implement the embodiments disclosed herein, 5G core network vendors would follow standardization guidelines. For instance, UPFs and SMFs from different vendors would configure their products in a uniform fashion with universal configuration values, e.g., with a common timer expiration value and a common number of retries. In this manner, the duplicate detection and removal process would work across inter-vendor and intra-vendor SMF and UPF product integrations.

Figure 5:
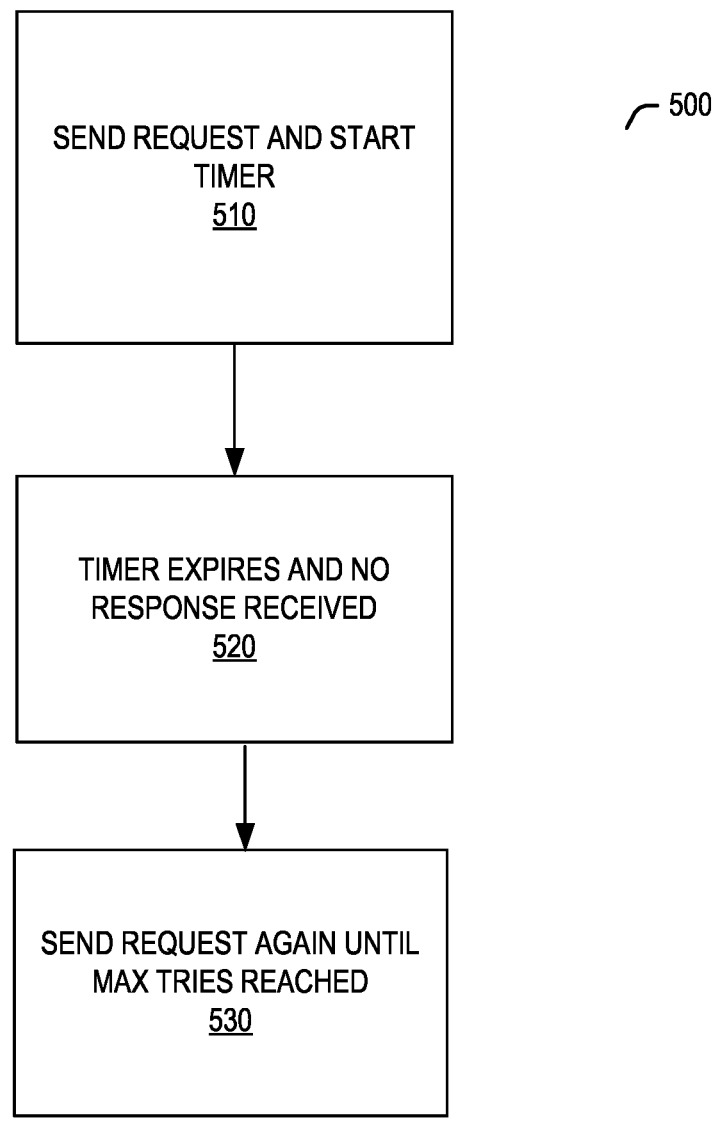
FIG. 5 depicts an exemplary method for sending and retransmitting messages in accordance with disclosed embodiments.

The disclosed methods for performing duplicate message detection and removal are further described with references to FIGS. 5-9 below. FIG. 5 illustrates an exemplary method 500 for sending and retransmitting messages in accordance with disclosed embodiments. Method 500 may be performed by any suitable processor discussed herein, for example, a processor included in the SMF. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 500 starts in step 510 when the SMF or similar component sends a request and starts the timer. More specifically, the SMF sends a request, such as a PFCP session establishment request to the UPF. After sending the request in step 510, the SMF awaits a response from the UPF. When, in step 520, the timer expires and no response has been received at the SMF, the SMF sends a request again until a maximum number of tries has been reached in step 530. If the maximum number of tries is reached in step 530 and no response is received, the SMF may target a different UPF or abandon the session. Of course in some instances after sending the request and starting the timer in step 510, the SMF will receive a response and in that situation, the SMF does not retransmit the request.

Figure 6:
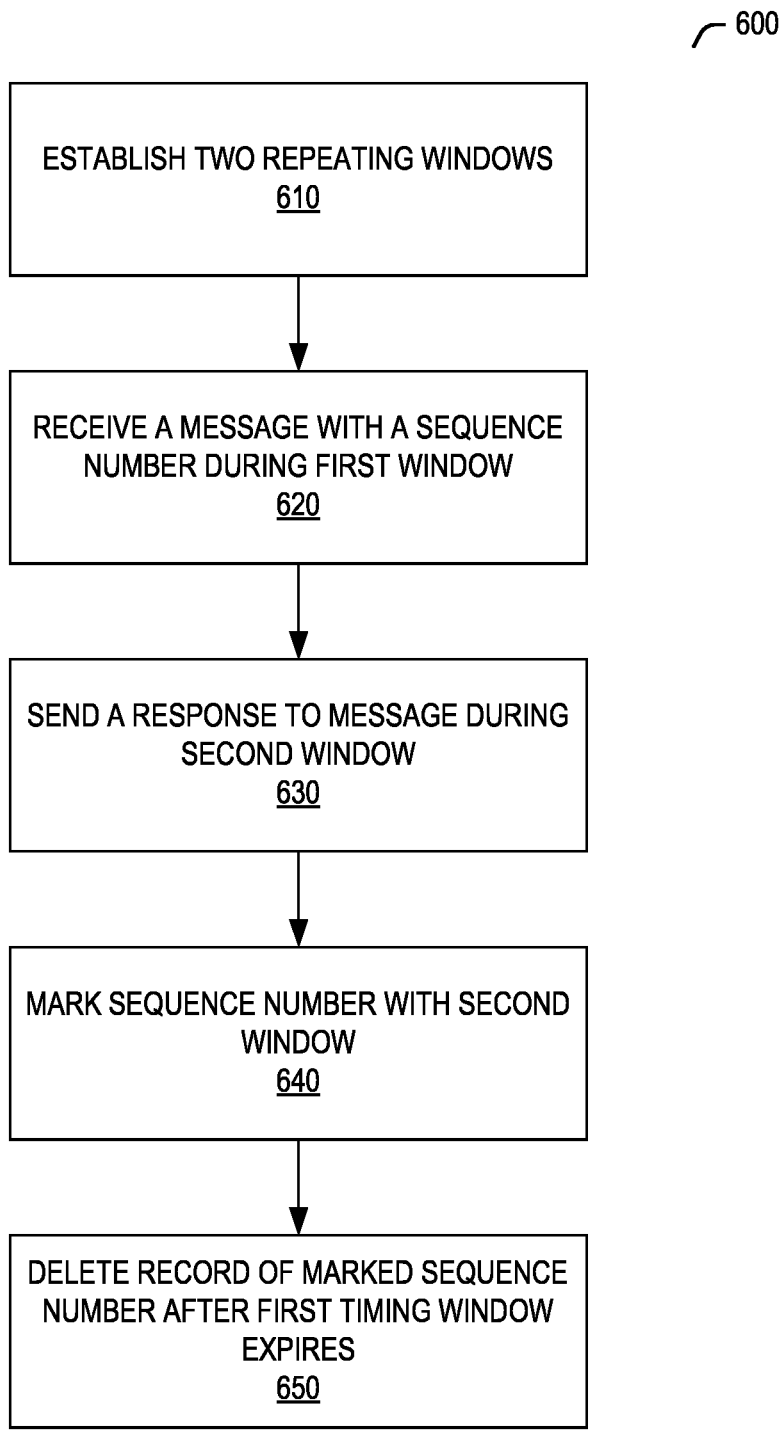
FIG. 6 depicts an exemplary method for duplicate detection in accordance with disclosed embodiments.

FIG. 6 depicts an exemplary method for duplicate detection in accordance with disclosed embodiments. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 600 starts in step 610 when two repeating windows are established. In embodiments set forth herein, the windows are consistent across the core network and are equal to the retransmission window of the SMF. Thus, if the SMF retransmits after waiting three seconds, then the two repeating windows are set to three seconds. A single timer in the network can be utilized, or alternatively, timers in multiple components can be synchronized across the network.

In step 620, a UPF component 200 receives a message tagged with a sequence number during a first window. As set forth above, every message is transmitted with a sequence number and the sequence numbers are re-used.

In step 630, the UPF component 200 sends a response to the message tagged with the sequence number during a second window. Upon sending the response, the UPF component marks the sequence number with second window (the window during which the response is sent) in step 640.

In step 650, the UPF component 200 deletes the record of the marked sequence number after the first timing window expires. More specifically, the UPF component 200 receives the message during the first window and sends the response and tags the sequence number during the second window. After the second window terminates, the first window repeats and the UPF component 200 deletes the record of the marked sequence number after the first window expires in step 650.

Figure 7:
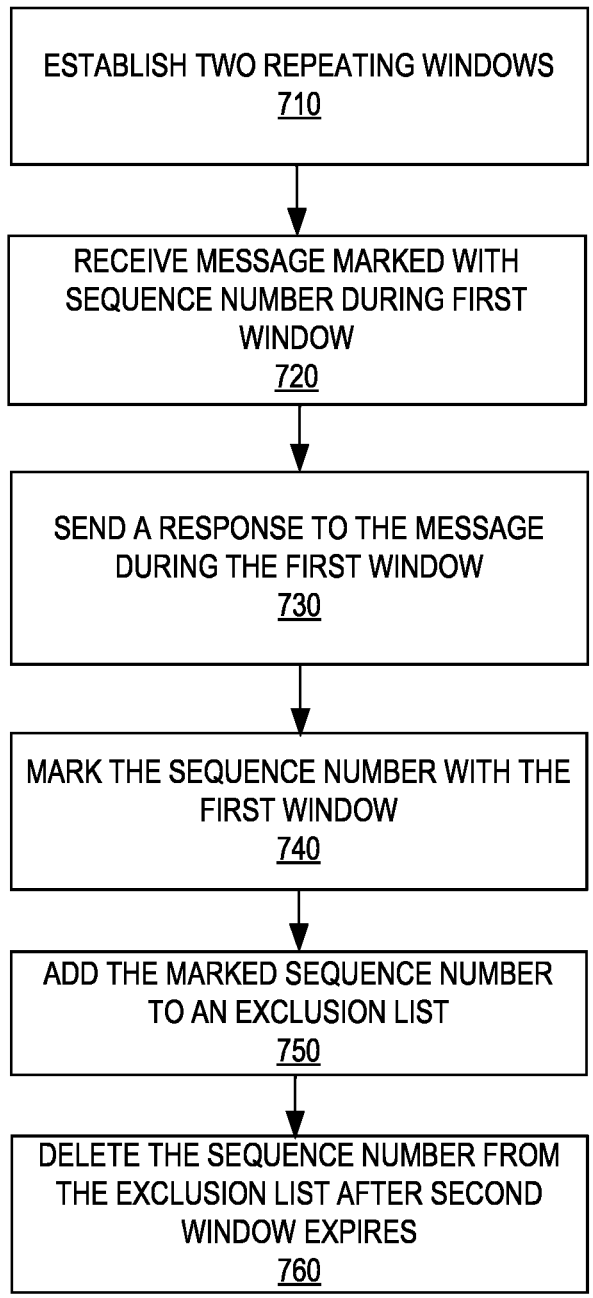
FIG. 7 depicts another exemplary method for duplicate detection in accordance with disclosed embodiments.

FIG. 7 depicts another exemplary method for duplicate detection in accordance with disclosed embodiments. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 700 may be performed by a core network component or function, such the UPF component 200 in a 5G network. A duplicate detection processor such as that shown in FIG. 2 associated with these components and functions may cause the steps described herein to be performed.

In step 710, the duplicate detection processor 222 or other processor in the core network may establish two repeating windows. As set forth above, the two repeating windows should be equal in duration and equal to the duration of the retransmission window of the SMF.

In step 720, the UPF component 200 receives a message marked with a sequence number during the first window, which may for example, be from 0 to 5 seconds. In step 730, the UPF component 200 sends a response to the message during the first window. For example, the UPF component 200 may receive the message at 1.2 seconds and respond to the message at 4.5 seconds. Therefore, both the receipt of the message and the response to the message occur within the first window.

In step 740, the UPF component 200 marks the sequence number with the first window. In step 750, the UPF component 200 adds the marked sequence number to an exclusion list. Finally, in step 760, the UPF component 200 deletes the sequence number from the exclusion list after the second window expires. For example, the second window may expire at 10 seconds. As set forth above, the sequence number was added to the exclusion list at about 4.5 seconds. Accordingly, any messages received by the UPF component between 5 and 10 seconds having the sequence number would be considered duplicate messages and would be discarded. However, at 10 seconds, after the second window expires, the sequence number is deleted from the exclusion list and can be utilized by the SMF and will be associated with a unique message by the UPF component 200.

Figure 8:
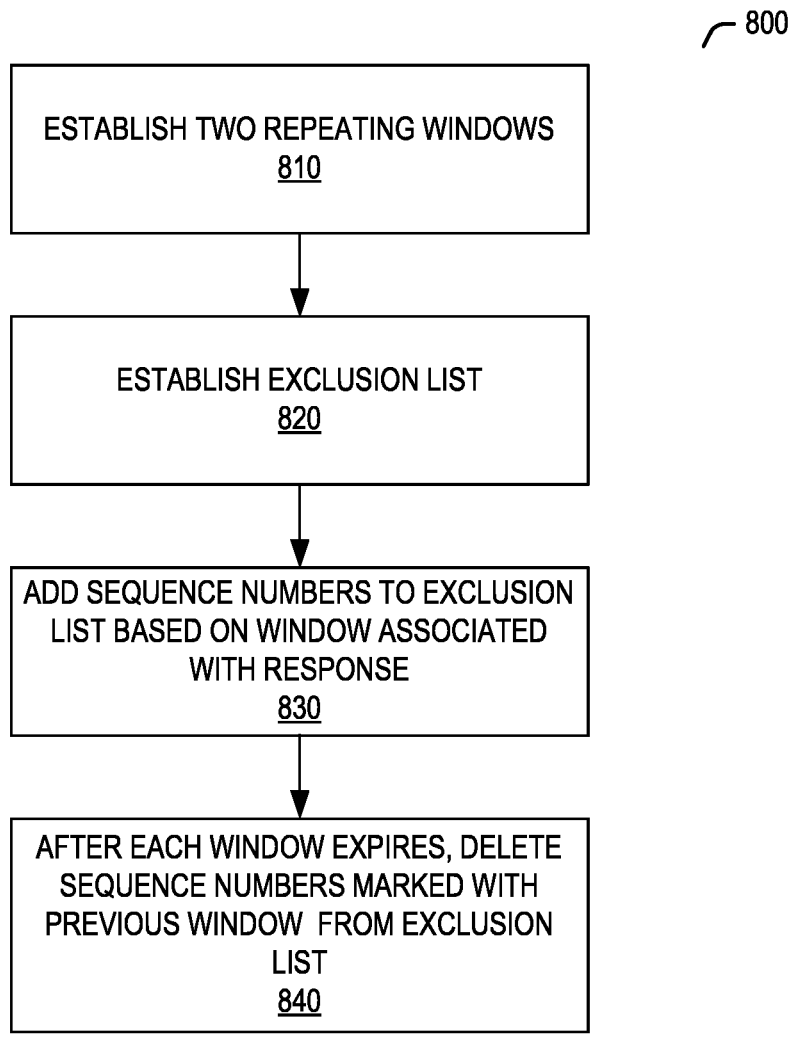
FIG. 8 illustrates an exemplary method for managing an exclusion list in in accordance with disclosed embodiments.

FIG. 8 illustrates an exemplary method for managing an exclusion list in in accordance with disclosed embodiments. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 800 may be performed by a core network component or function, such as the UPF component 200 in a 4G or 5G network. As set forth above, two repeating windows are established in step 810. The windows are of equal duration and are also equal to a retransmission period of the sending component, which may be an SMF. A duplicate detection processor, such as the processor 222 may cause the steps described herein to be performed.

In step 820, the duplicate detection processor 222 may establish an exclusion list. The exclusion list is intended to exclude specific sequence numbers from being utilized in the transmission of a new message. Accordingly, whenever a message is sent with a sequence number on the exclusion list, the message will be considered to be a duplicate.

In step 830, the duplicate detection processor 222 may add sequence numbers to the exclusion list based on the window associated with the response. Thus, the duplicate detection processor 222 marks the sequence number with the response window when adding the sequence number to the exclusion list.

Finally, in step 840, after each window expires, the duplicate detection processor 222 deletes sequence numbers marked with the previous window from the exclusion list. Thus, for example, at the end of the second window, the duplicate detection processor 222 scans the exclusion list and deletes all sequence numbers on the exclusion list marked with the first window. Similarly, at the end of the first window, the duplicate detection processor 222 scans the exclusion list and deletes all sequence numbers on the exclusion list marked with the second window. After the sequence numbers are deleted from the exclusion list, they can be reused with unique messages.

Figure 9:
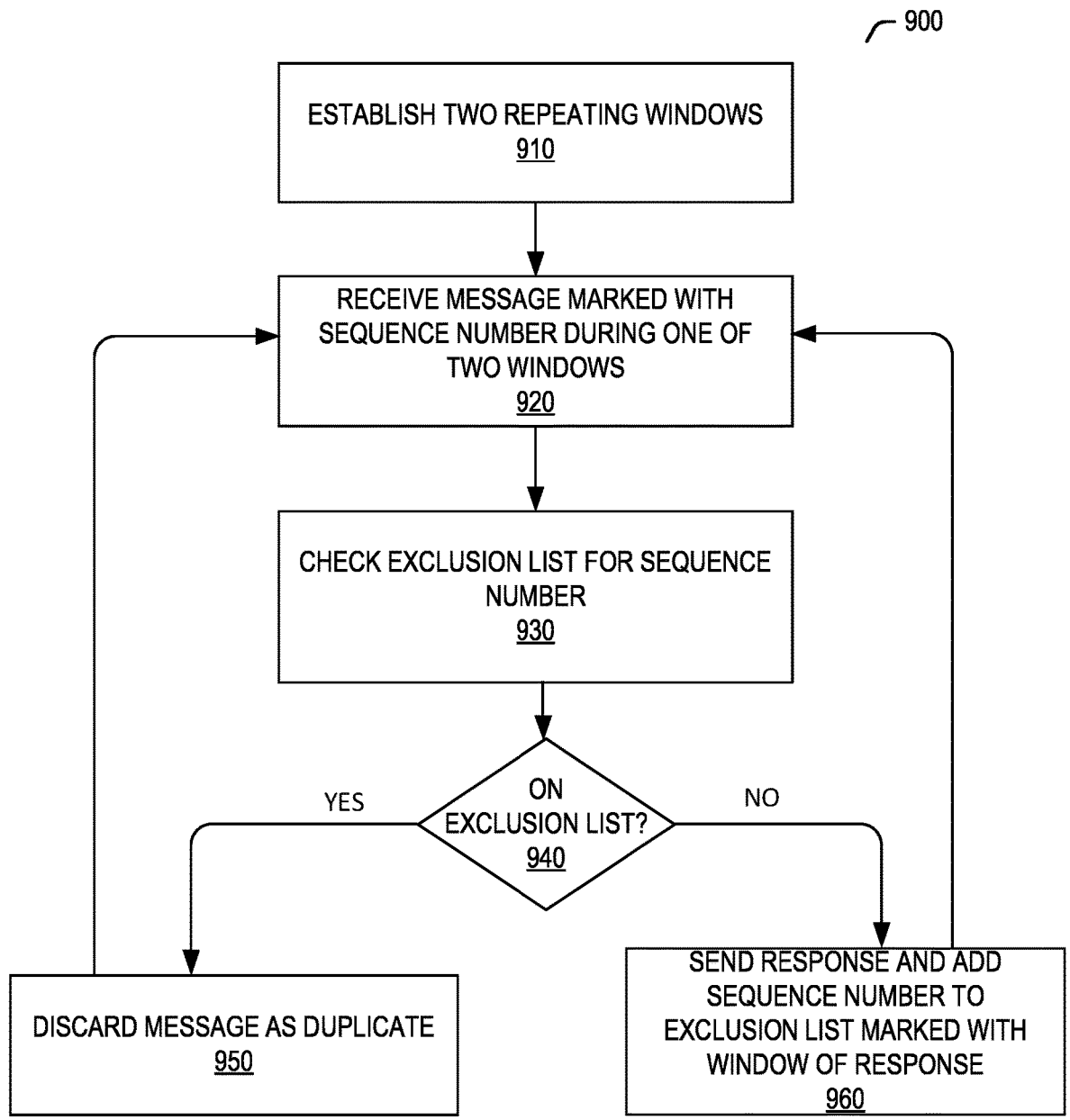
FIG. 9 illustrates an exemplary method for processing incoming messages in accordance with disclosed embodiments.

FIG. 9 illustrates an exemplary method for processing incoming messages in accordance with disclosed embodiments. Although FIG. 9 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The method may be performed for example, by the duplicate detection processor 222 or other processor of the core network. As set forth above, two repeating windows are established in step 910. The windows are of equal duration and are also equal to a retransmission period of the sending component, which may be an SMF. The time periods may be synchronized across the core network.

In step 920, the duplicate detection processor 222 receives a message marked with a sequence number during one of the two established windows. In step 930, the duplicate detection processor 222 checks the exclusion list for the sequence number. If the sequence number is on the exclusion list in step 940, the duplicate detection processor discards or disregards the message as a duplicate in step 950.

If however, the sequence number is not on the exclusion list in step 940, the duplicate detection processor 222 sends a response and adds the sequence number to the exclusion list marked with the window of response in step 960.

In some embodiments, methods 500, 600, 700, 800, and 900 may include additional steps or operations. Furthermore, the methods may include steps shown in each of the other methods. As one of ordinary skill in the art would understand, the methods 500, 600, 700, 800, and 900 may be integrated in any useful manner.

By the methods described herein, duplicate messages that have already been received and responded to can be identified and discarded, thereby improving the retransmission success rate for valid retransmissions in wireless networks. The method results in a reduction in computational complexity and bandwidth requirements The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for identifying and discarding a retransmitted duplicate message, the method comprising:
    receiving, at a user plane function (UPF) component from a control plane function, a message tagged with a sequence number during one of a first timing window and a second timing window, wherein the first and second timing windows are consecutive recurring timing windows in a network;
    sending a response to the message from the UPF to the control plane function during one of the timing windows,
    marking the sequence number with the timing window of the response, wherein the timing of the response occurs during the first or the second timing window;
    maintaining a record of the marked sequence number;
    utilizing the record to identify and discard the retransmitted duplicate message by identifying a new message as a retransmitted duplicate message upon finding the new message is tagged with the marked sequence number;
    after the first timing window expires, if the first timing window is a recurring timing window and the marking on the sequence number is associated with the response occurring during the second timing window, deleting the record of the marked sequence number associated with the response occurring during the second timing window; and
    after the second timing window expires, if the marking on the sequence number is associated with the response occurring during the first timing window, deleting the record of the marked sequence number associated with the response occurring during the first timing window.

2. The method of claim 1, further comprising maintaining an exclusion list of sequence numbers marked with the first timing window and the second timing window, wherein sequence numbers on the exclusion list are associated with retransmitted duplicate messages.

3. The method of claim 2, further comprising checking the exclusion list upon receipt of the message tagged with the sequence number to determine if the sequence number is on the exclusion list, and deleting the message when the sequence number is on the exclusion list.

4. The method of claim 2, further comprising clearing all sequence numbers on the exclusion list marked with the first timing window after expiration of the second timing window.

5. The method of claim 2, further comprising clearing all sequence numbers on the exclusion list marked with second timing window after expiration of the first timing window.

6. The method of claim 1, wherein the first timing window and the second timing window have equal lengths.

7. The method of claim 1, further comprising marking the sequence number with timing window at the user plane function (UPF) component of the network.

8. The method of claim 1, further comprising receiving the message tagged with the sequence number from a session management function (SMF) component of the network.

9. The method of claim 8, wherein the SMF component sends the message and retransmits the message when no response is received after a specified time period.

10. The method of claim 9, wherein the specified time period is equal to a duration of each timing window.

11. The method of claim 1, wherein the message is a packet forwarding control protocol (PFCP) session establishment request message.

12. A system for identifying and discarding a retransmitted duplicate message, the system comprising:
    At least one processor programmed to perform operations for identifying and discarding the retransmitted duplicate message including;
    receiving, at a user plane function (UPF) component from a control plane component, a message tagged with a sequence number during one of a first timing window and a second timing window, wherein the first and second timing windows are consecutive recurring timing windows in a network;
    sending a response to the message during one of the timing windows,
    marking the sequence number with the timing window of the response, wherein the timing of the response occurs during the first or the second timing window;
    adding the marked sequence number to an exclusion list;
    utilizing the exclusion list to identify and discard the retransmitted duplicate message by identifying a new message as a retransmitted duplicate message upon finding the new message is tagged with the marked sequence number on the exclusion list;
    after the first timing window expires, if the first timing window is a recurring timing window and the marking on the sequence number is associated with the response occurring during the second timing window, deleting the sequence number associated with the response occurring during the second timing window from the exclusion list; and
    after the second timing window expires, if the marking on the sequence number is associated with the response occurring during the first timing window, deleting the sequence number associated with the response occurring during the first timing window from the exclusion list.

13. The system of claim 12, wherein the processor further checks the exclusion list upon receipt of the message tagged with the sequence number to determine if the sequence number is on the exclusion list, and discards the message if the sequence number is on the exclusion list.

14. The system of claim 12, wherein the processor further clears all sequence numbers on the exclusion list marked with the first timing window after expiration of the second timing window.

15. The system of claim 12, wherein the processor further clears all sequence numbers on the exclusion list marked with second timing window after expiration of the first timing window.

16. The system of claim 12, wherein the first timing window and the second timing window have equal lengths.

17. A non-transitory computer readable medium storing instructions for execution by a processor to perform operations for identifying and discarding a retransmitted duplicate message including:
   receiving, at a user plane function (UPF) component from a control plane component, a message tagged with a sequence number during one of a first timing window and a second timing window, wherein the first and second timing windows are consecutive recurring timing windows in a network;
   sending a response to the message during one of the timing windows,
   marking the sequence number with the timing window of the response, wherein the timing of the response occurs during the first or the second timing window;
   adding the marked sequence number to an exclusion list;
   utilizing the exclusion list to identify and discard a retransmitted duplicate message by identifying a new message as a retransmitted duplicate message upon finding the new message is tagged with the marked sequence number on the exclusion list;
   after the first timing window expires, if the first timing window is a recurring timing window and the marking on the sequence number is associated with the response occurring during the second timing window, deleting the sequence number associated with the response occurring during the second timing window from the exclusion list; and
   after the second window expires, if the marking on the sequence number is associated with the response occurring during the first timing window, deleting the sequence number associated with the response occurring during the first timing window from the exclusion list.

18. The non-transitory computer readable medium of claim 17, the operations further comprising checking the exclusion list upon receipt of the message tagged with the sequence number to determine if the sequence number is on the exclusion list, and discarding the message if the sequence number is on the exclusion list.

19. The non-transitory computer readable medium of claim 17, the operations further comprising clearing the sequence numbers on the exclusion list marked with the first timing window after expiration of the second timing window.

20. The non-transitory computer readable medium of claim 17, the operations further comprising clearing the sequence numbers on the exclusion list marked with second timing window after expiration of the first timing window.

* * * * *